Jan. 17, 1967   M. SCHMIDT   3,298,158
APPARATUS FOR PRESERVING AND SEALING A SERVING TRAY
OF THERMOPLASTIC MATERIAL CONTAINING FOOD
PRODUCTS PARTICULARLY FROZEN FOODS
Filed Dec. 17, 1963   2 Sheets-Sheet 1

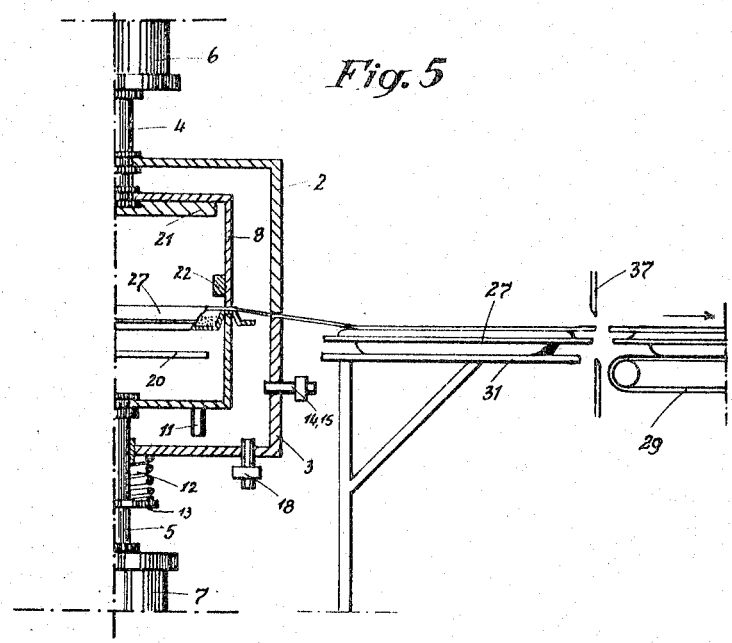
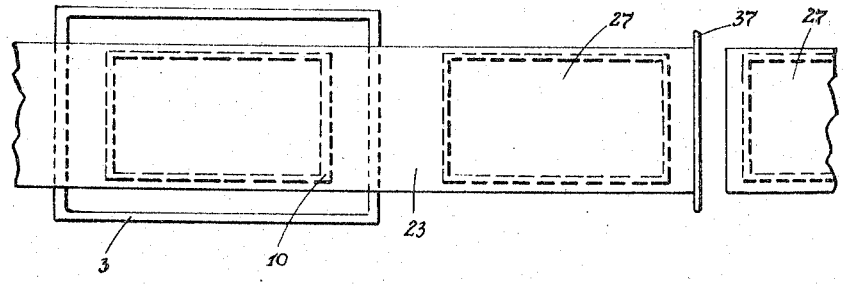

United States Patent Office 3,298,158
Patented Jan. 17, 1967

3,298,158
APPARATUS FOR PRESERVING AND SEALING A SERVING TRAY OF THERMOPLASTIC MATERIAL CONTAINING FOOD PRODUCTS PARTICULARLY FROZEN FOODS
Max Schmidt, Ansbach, Middle Franconia, Germany, assignor to Bellmann & Co., Ansbach, Germany
Filed Dec. 17, 1963, Ser. No. 331,297
Claims priority, application Germany, Dec. 18, 1962, B 70,028
9 Claims. (Cl. 53—112)

This invention relates to a method of and an apparatus for the preservation and sealing of a serving tray or similar receptacle containing prepared foods generally referred to as frozen foods.

It is, of course, known to provide means by which prepared foods are automatically introduced into serving trays of synthetic material, then sealed with a cover sheet by a welding or fusing operation, and subsequently punching the cover from the sheet. The cover sheet closes the tray along the raised peripheral edge or rim and is removed only shortly before the food, which has been heated to the proper temperature for consumption, is to be served.

However, in the case of prepared foods having a relatively liquid consistency, such as soups, sauces and the like, problems have arisen in that these substances tend to float about in the space provided by the cover sheet which imparts an unsightly appearance to the clear cover sheet.

Therefore, the cover sheet must be positioned tightly against the contents of the serving tray with a prior evacuation of the entrapped air.

Furthermore, it is most desirable that food products stored under the so-called "deep freeze" condtions be preservable for a longer period but without loss of flavor of such products. It has been demonstrated that due to inadequate cooling of the food within the tray, sometimes water condensation occurred which, over a period of time rendered the food unpalatable.

An important object of the present invention is to solve the above-mentioned problem.

Broadly, the invention comprises opening a two part vacuum bell jar, positioning a serving tray with an applied cover sheet within the bell jar, closing the two parts, exhausting the air from the jar, applying heat for plasticizing the cover sheet, welding the sheet to the peripheral rim of the tray, and opening the two parts whereby the surrounding air presses the cover sheet tightly against the food in the tray.

Additional objects and advantages of the invention will become more readily apparent from the ensuing detailed description and annexed drawings, and in which drawings:

FIG. 5 is a fragmentary elevational view partly in cross section illustrating the welding operation with the vacuum bell jar closed and cut-off means located exteriorly of the bell jar, and, FIG. 6 is a top plan view of the cover sheet arrangement illustrated in FIG. 5.

Figure 1:
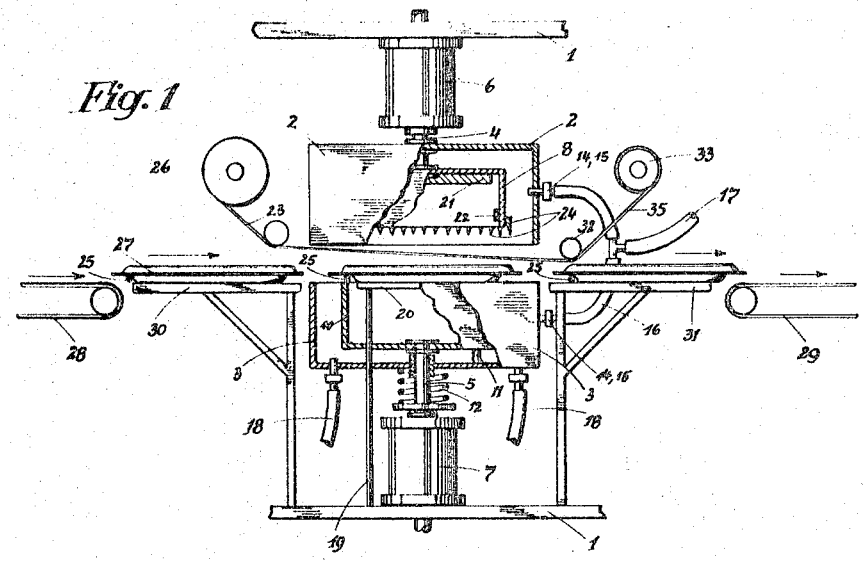
FIG. 1 is a view in elevation, partly broken away and partly in cross section of the apparatus showing the vacuum bell jar open, the welding means, punch means, feeding of the cover sheet and a serving tray in position.

Referring to the drawings, it will be noted that a vacuum bell jar J is mounted on a frame 1, and includes upper and lower parts 2 and 3 capable of vertical movements in opposite directions. Such movements are effected by means of compressed air cylinders 6 and 7, and piston rods 4 and 5 which extend through the upper and lower parts 2 and 3. Within the parts 2 and 3, the piston rods 4 and 5 carry an upper welding tool 8 and welding frame 9 and lower welding support 10, respectively. The support 10 is provided with a separator 11 which becomes effective upon the actuation of the cylinder 7, as will later be more fully described.

In order to promote the sealing necessary for effecting a vacuum and for the welding operation within the bell jar, a pressure spring 12 surrounds the piston rod 5 and is positioned between spring plate 13 and the bottom wall of the lower part 3. During the several stages of the working cycle, the spring 12 together with the plate 13 augments the working pressure when sealing the bell jar and during the welding operation. It will be noted that pipe sections 14 having shut-off valves 15 communicate with the interior of the bell parts 2 and 3, and are connected via hoses 16 and a T-fitting 16' to main conduit 17. Conduits 18 are provided with shut-off valves 18' and the conduits communicate with the interior of lower part 3 for admitting, if desired, nitrogen into the bell jar in the event the type of food or the necessity of an extra long period of preservation should make special preservation with this gas appear to be advantageous.

The lower welding support 10 is provided with a horizontal platform 20 carried by one or more vertical standards 19 for the temporary support of serving trays 27 as such trays are fed into the apparatus, as clearly shown in FIG. 1. It can be seen that at least the peripheral rim of the tray projects beyond the perimeter of the support 20 for subsequent engagement by the welding support 10.

The upper welding tool 8 is provided in a known manner with heating elements 21 and 22, and the heating element 21 serves to raise the temperature of cover sheet 23 which travels transversely of the apparatus to a plasticizing temperature before and during the welding cycle. The heating element 22 which is arranged around the inside of the frame 9 simultaneously heats the welding edges and separating member 24 is located exteriorly of the tool 8. As clearly shown in FIG. 1, the member 24 is formed with a series of pointed teeth or projections 24', and hence functions in the nature of a perforating tool.

The cover sheet 23 is withdrawn indirectly from a supply roll 26 by means of a timed actuation of horizontally operating grippers 25 in such a fashion that the grippers push the tray 27 out of the welding means while it is still connected with the cover sheet. The feeding of the trays to the apparatus and the removal therefrom is accomplished by endless conveyors 28 and 29, respectively. Stationary work tables 30 and 31 are located at the infeed and outfeed sides of the apparatus for supporting the incoming trays and the outgoing sealed trays, and also providing for a maximum of trouble-free operation of the pairs of grippers 25.

In operation, the upper and lower parts 2 and 3 are in the open position shown in FIG. 1, and an open serving tray 27, preferably filled with frozen food is moved to the table 30 via the conveyor 28 and by means of the first pair of grippers 25 is pushed onto the platform 20. By the admission of compressed air into the cylinders 6 and 7, the parts 2 and 3, together with welding components 8 and 10 move vertically and uniformly toward each other with the lower component 10 engaging the tray 27 along its undercut peripheral rim and raising the tray. While the upper part 2 and upper welding component 8 are fixedly secured without change in spacing to the piston rod 4, the lower part 3 and lower welding component 10 are, by virtue of the spring 12 raised at the same speed at a distance from each other determined by the separator 11, but the part 3 is yieldingly and axially slidably mounted on the rod 5. The closing movement terminates as soon as the peripheral edges of the parts 2 and 3 engage, and during this cycle, the sheet 23 is withdrawn from the supply roll 26 and lies tightly against the tray opening and is clamped firmly against the lateral peripheral edges of the parts 2 and 3 so that the interior of the bell jar is sealed air tight.

Figure 2:
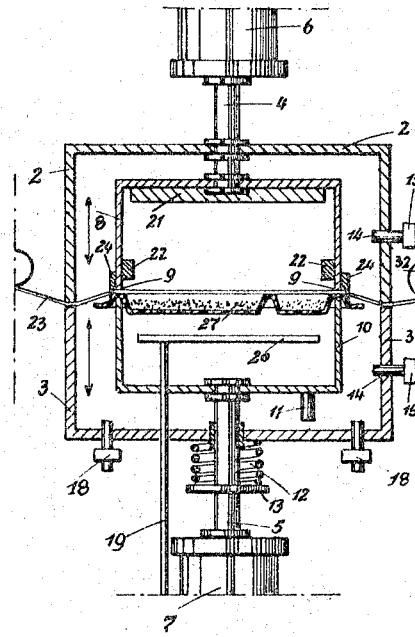
FIG. 2 is a view in elevation and partly in cross section and on an enlarged scale illustrating the welding operation with the vacuum bell just closed.
Figure 3:
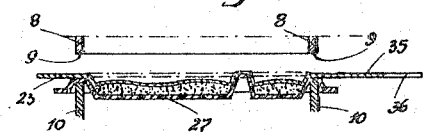
FIG. 3 is a fragmentary view in cross section of a serving tray after the opening of the vacuum bell jar.

The upper and lower welding components 8 and 10 have not made contact when the peripheral edges of the parts 2 and 3 engage since the air must first be evacuated by means of the pipe sections 14, valves 15, hoses 16, and conduit 17. However, the heating elements 21 and 22 of the upper welding component 8 are constantly operating so that in the interim the plasticizing of the portion of the sheet 23 lying against the tray opening can be effected. Immediately thereafter as will be appreciated from FIGS. 2 and 3, there is achieved, after an additional push from the cylinder 6 a firm placement of the frame 9 upon the cover sheet and upstanding rim of the tray thereby heat welding the respective parts together.

The foregoing operation is made possible due to the fact that the lower piston rod 5 maintains the lower welding component 10 on which the tray 27 is positioned stationary at the height to which it has been raised and that the upper piston rod 4 continues to press the part 2 and he upper welding component 8 downwardly. The impact of the welding components on the tray rim is made further possible since the lower part 3 of the bell jar can be displaced downwardly against the action of the spring 12. When the welding components come together, the teeth 24' of the member 24 perforate the cover sheet 23 along the upstanding rim of the tray with the member 24 and teeth having been heated by the heating element 22 for making the teeth more effective.

After the foregoing, the welding cycle is completed and the upper and lower parts 2 and 3 are returned to their starting positions by retracting the piston rods 4 and 5 into the cylinders 6 and 7. Since the tray is now exposed to outside air, the cover sheet 23 which has been heated to processing temperature is pressed tightly against the food contained in the tray, as best disclosed in FIG. 3.

With the placement of the tray on the table 31 after the welding operation, the cover sheet 23 is guided upwardly by a guide roller 32 and is wound on a reel 33 in a known manner. Because of the change of direction of the cover sheet 23 upwardly from the horizontal at the guide roller 32 and by reason of the perforations, the sheet becomes separated along perforations 34 so that the remainder of the sheet identified 35 and which now constitutes waste is provided with rectangular window openings 36. The completed food package moves from the table to the conveyor 29, and is moved to a freezer for storage or directly for consumption.

In lieu of perforating the cover sheet and subsequently tearing off the completed food packages, the invention also comprehends the use of a knife or shears for cutting the same in conjunction with the apparatus. In such an embodiment, a take-up reel mechanism is unnecessary since there is no waste sheet material.

After completion of the welding operation as described above, the feeding of the tray on the table 31 to cutting means 37 for separating the cover sheet 23 between adjacent trays 27 can be accomplished by a pair of grippers.

This particular arrangement has the advantage that cover sheets corresponding substantially to the width of the trays can be used which eliminates the waste of material.

Figure 4:
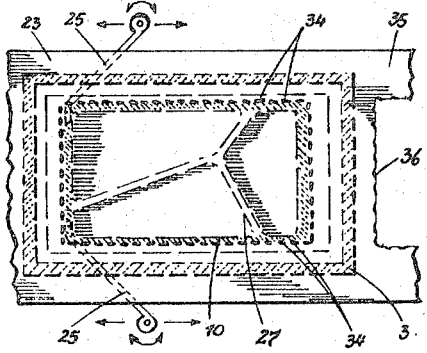
FIG. 4 is a top plan view of the cover sheet and tray after the welding operation.

In addition, the upper and lower parts 2 and 3 need not grasp the long sides of the sheet, but it is sufficient that the passage of the sheet through the bell jar be in the manner disclosed in FIG. 6. This form does not require the pipe section 14, valve 15 and hose 16 for the upper part 6 which is only necessary if the sheet 23 is of such width as to divide the interior of the closed bell jar into two separate chambers with the side edges of the sheet extending beyond the bell jar as illustrated in FIG. 4.

The invention is not to be confined to any strict conformity to the showings in the drawings, but changes or modifications may be made therein so long as such changes or modifications mark no material departure from the spirit and scope of the appended claims.

What I claim is:

1. An apparatus for preserving and sealing a serving tray of thermoplastic material containing frozen food with a cover sheet, comprising a vacuum bell jar, said bell jar including upper and lower parts, means operably connected to said upper and lower parts for effecting relative movement between said upper and lower parts for closing and opening said bell jar, respectively, means for supporting the tray and cover sheet within the closed bell jar, valve controlled conduit means communicating with the interior of said bell jar adapted to be connected with a source of suction for evacuating said bell jar, welding means within said upper part and cooperable with the tray and cover sheet for welding the cover sheet to the peripheral edge of the tray, said welding means including a frame mounted within the upper part, a first heating means carried by said frame for plasticizing the portion of the cover sheet located therebeneath, and a second heating means so located on said frame as to weld the cover sheet to the peripheral edge of the tray.

2. The apparatus as claimed in claim 1, including further valve controlled conduit means communicating with the interior of the bell jar for introducing a preserving gas into the bell jar.

3. The apparatus as claimed in claim 1, in which the means for effecting relative movement between said upper and lower parts includes an air cylinder for each part and a piston rod operably related to each cylinder and each part, said piston rod for the cylinder for said lower part being slidable relative to said lower part, an abutment on said last-mentioned piston rod, and spring means biased between said abutment and said lower part whereby said lower part is yieldingly and axially slidable upon said last-mentioned piston rod.

4. The apparatus as claimed in claim 1, including cutting means for severing the cover sheet between adjacent trays located exteriorly of the bell jar.

5. The apparatus as claimed in claim 4, in which said cover sheet has a width dimension corresponding to the width of the serving tray.

6. An apparatus for preserving and sealing a serving tray of thermoplastic material containing frozen food with a cover sheet, comprising a vacuum bell jar having upper and lower parts, means operably connected to said upper and lower parts for moving said parts toward and away from each other for closing and opening said bell jar, respectively, means for supporting the tray and cover sheet within the closed bell jar, and welding means within said upper part cooperable with the tray and cover sheet for welding the cover sheet to the peripheral edge of the tray, said welding means including a frame mounted within said upper part, first and second heating elements carried by said frame, frame means mounted within said lower part constituting said supporting means for the tray and cover sheet, said first heating element being so carried by the frame as to plasticize the portion of the cover sheet located therebeneath, and said second heating element being so located on the frame as to weld the cover sheet to the peripheral edge of the tray.

7. The apparatus as claimed in claim 6, including pointed projections on said frame for perforating the cover sheet along said peripheral rim.

8. The apparatus as claimed in claim 7, in which said pointed projections are mounted on said frame in proximity to the second heating element for being heated thereby.

9. The apparatus as claimed in claim 8, including a take-up reel for the portions of the cover sheet located outside of the perforations.

References Cited by the Examiner

UNITED STATES PATENTS 3,196,590  7/1965  Ollier et al. _____ 53—112

FOREIGN PATENTS 237,758  12/1959  Australia.

TRAVIS S. McGEHEE, *Primary Examiner.*